United States Patent
Shah et al.

(10) Patent No.: US 8,682,358 B1
(45) Date of Patent: Mar. 25, 2014

(54) METHOD AND SYSTEM FOR PAGING A MOBILE STATION

(75) Inventors: Maulik K. Shah, Overland Park, KS (US); Srikanth Pulugurta, Overland Park, KS (US); Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 552 days.

(21) Appl. No.: 12/553,661

(22) Filed: Sep. 3, 2009

(51) Int. Cl.
  *H04W 4/00* (2009.01)
  *H04W 68/00* (2009.01)
  *H04B 7/00* (2006.01)
  *G08C 17/00* (2006.01)

(52) U.S. Cl.
  USPC ......... 455/458; 455/426.1; 455/515; 370/311

(58) Field of Classification Search
  USPC ................ 455/426.1, 458, 515, 404.1–404.2, 455/414.2–414.4, 440, 456.1–457; 340/7.2–7.45; 370/311–313
  See application file for complete search history.

(56) References Cited

U.S. PATENT DOCUMENTS

| | | | |
|---|---|---|---|
| 5,369,681 A | 11/1994 | Boudreau et al. | |
| 6,181,945 B1 | 1/2001 | Lee | |
| 6,745,039 B1 * | 6/2004 | Di Lalla | 455/458 |
| 7,366,526 B2 | 4/2008 | Zhang et al. | |
| 2006/0223550 A1 * | 10/2006 | Zhang et al. | 455/458 |
| 2007/0293245 A1 | 12/2007 | Del Signore et al. | |
| 2008/0032713 A1 | 2/2008 | Yang | |
| 2008/0096520 A1 * | 4/2008 | Benco et al. | 455/404.2 |
| 2008/0207227 A1 * | 8/2008 | Ren et al. | 455/458 |
| 2008/0293437 A1 * | 11/2008 | Ranganathan et al. | 455/458 |
| 2009/0181674 A1 | 7/2009 | Nguyen et al. | |

* cited by examiner

*Primary Examiner* — Marisol Figueroa
*Assistant Examiner* — Erica Navar

(57) ABSTRACT

A first serving system that serves a first serving area receives a request to connect a call to a mobile station having a last reported location corresponding to a border area. The border area is proximal to a second service area that is served by a second serving system. The first serving system pages the mobile station in a first paging zone in the first service area. If the probability of successfully paging the mobile station in a second paging zone in the second service area is sufficiently high, the first serving system may also have the mobile station paged in the second paging zone by transmitting an inter-system page request to the second serving system. To determine the probability, the first serving system may look up a historical success rate for successfully paging in the second paging zone mobile stations having last reported locations corresponding to the border area.

15 Claims, 4 Drawing Sheets

METHOD AND SYSTEM FOR PAGING A MOBILE STATION

BACKGROUND

A wireless network may use a paging channel to wirelessly transmit a page message into a wireless coverage area (such as a cell) where a mobile station may be operating in order to contact the mobile station regarding an incoming call. If the mobile station receives the page message, the mobile station may wirelessly transmit a response over an access channel.

OVERVIEW

In a first principal aspect, an exemplary embodiment provides a method for paging a mobile station. In accordance with the method, it is determined that a last reported location of the mobile station corresponds to a first area in a first paging zone and that the first area is proximal to a second paging zone. A probability of successfully paging the mobile station in the second paging zone is determined. A first attempt to page the mobile station is made, wherein the first attempt comprises paging the mobile station in the first paging zone and, if the probability exceeds a first threshold, paging the mobile station in the second paging zone.

In a second principal aspect, an exemplary embodiment provides a method for a wireless network. The wireless network comprises a first serving system serving a first service area and a second serving system serving a second service area, the first service area including a border area that is proximal to the second service area. In accordance with the method, the first serving system receives a request to connect an incoming call to a mobile station having a last reported location corresponding to the border area. The first serving system looks up an inter-system paging success rate for the border area. The first serving system determines whether to transmit an inter-system page request to the second serving system based, at least in part, on the inter-system paging success rate.

In a third principal aspect, an exemplary embodiment provides a wireless network comprising a first paging zone that includes a border area, a second paging zone proximal to the border area, data storage, and a controller. The data storage stores a historical success rate for successfully paging in the second paging zone mobile stations having last reported locations corresponding to the border area in the first paging zone. The controller is configured to: (i) receive a request to connect an incoming call to a mobile station having a last reported location corresponding to the border area in the first paging zone; and (ii) in response to the request, determine whether to have the mobile station paged in the second paging zone based, at least in part, on the historical success rate.

DETAILED DESCRIPTION OF EXEMPLARY EMBODIMENTS

1. Introduction

Figure 1:
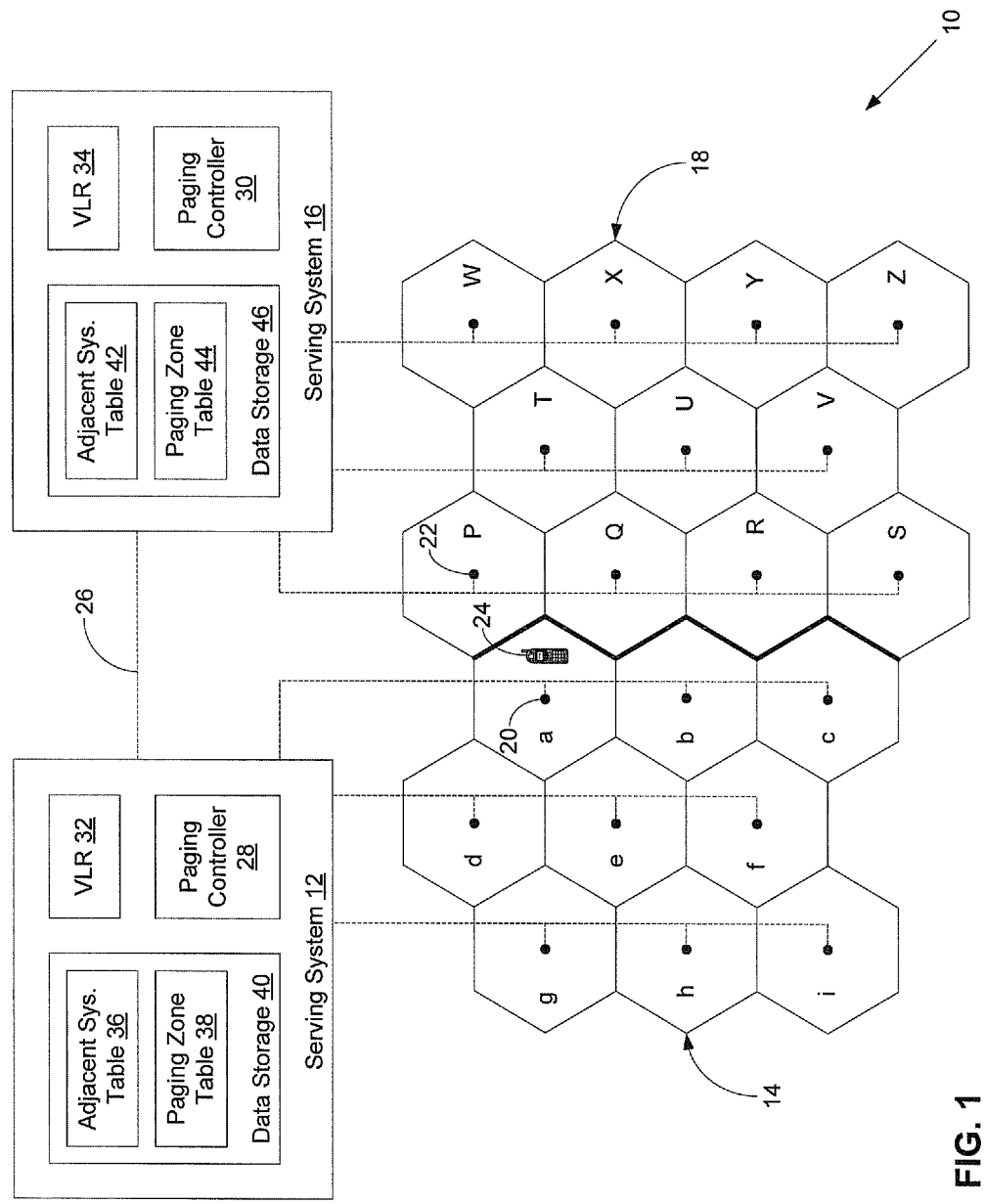
FIG. 1 is a block diagram of a wireless network, in accordance with an exemplary embodiment.

When a first serving system receives a request to connect an incoming call to a mobile station, the first serving system may use different procedures to page the mobile station depending on the mobile station's last reported location. In a default paging procedure, the first serving system may make one or more page attempts by paging the mobile station in a first paging zone that encompasses the mobile station's last reported location. If the one or more page attempts are unsuccessful, the first serving system may make an additional page attempt by paging the mobile station in a broader area, such as a system-wide area.

However, if the mobile station is located in a border area of the first paging zone, the first serving system may use a border area paging procedure to page the mobile station. In the border area paging procedure, the first serving system may page the mobile station in the first paging zone, as in the default paging procedure, but the first serving system may also have the mobile station paged in a second paging zone that is proximal to the border area of the first paging zone. The second paging zone may be served by a second serving system. In that case, the first serving system may transmit an inter-system page request (such as an IS-41 ISPAGE2 request) to the second serving system in order to have the mobile station paged in the second paging zone.

To determine whether to have the mobile station paged in the second paging zone, and when to do so (in the first page attempt or in the second page attempt), the first serving system may determine a probability of successfully paging the mobile station in the second paging zone. If the probability is greater than a first threshold, the mobile station may be paged in both the first and second paging zones in the first page attempt. If the probability is less than the first threshold, then the mobile station may be paged in only the first paging zone in the first page attempt. However, if the first page attempt is unsuccessful, the first serving system may make a second page attempt. If the probability is greater than a second threshold (which may be lower than the first threshold), the mobile station may be paged in both the first and second paging zones in the second page attempt. Otherwise, the mobile station may again be paged in only the first paging zone.

To determine the probability of successfully paging the mobile station in the second paging zone, the first serving system may look up a historical success rate for successfully paging in the second paging zone mobile stations that had last reported locations corresponding to the border area. Thus, the first serving system may build up paging statistics for each of its border areas and then use those paging statistics to determine the historical success rate for paging a given mobile station in a proximal paging zone when the given mobile station's last reported location corresponds to a given border area.

2. Exemplary Wireless Network

FIG. 1 illustrates a wireless network 10, in which exemplary embodiments may be employed. Wireless network 10 includes a first serving system 12 that serves a first service area 14 and a second serving system 16 that serves a second service area 18. Service areas 14 and 18 may each include a plurality of wireless coverage areas. Thus, service area 14 may include wireless coverage areas a-i, and service area 18 may include wireless coverage areas P-Z, as shown in FIG. 1. The wireless coverage in each of wireless coverage areas a-i and P-Z may be provided by a respective base station. This is exemplified in FIG. 1 by base station 20 that provides wireless coverage in area a, and base station 22 that provides wireless coverage in area P.

Within each wireless coverage area, the base station may wirelessly communicate with mobile stations to exchange voice, data, or other media. For example, base station 20 may communicate with a mobile station 24 when it is operating in area a, as shown in FIG. 1. Subsequently, mobile station 24 may into area P, in which case mobile station 24 may communicate with base station 22 instead. The mobile stations operating in service areas 14 and 18, such as mobile station 24, may be wireless telephones, wireless personal digital assistants, wirelessly-equipped laptop computers, or other wireless communication devices. The wireless communication between the base stations and the mobile stations in service areas 14 and 18 may conform to 1xRTT CDMA, EVDO, GSM/GPRS, IEEE 802.11, IEEE 802.16 protocols, or to some other wireless communications protocol. Service area 14 and 18 could use either the same wireless communication protocol or different wireless communication protocols.

Wireless coverage areas a-i and P-Z could be, for example, cells in a cellular communications network. Thus, it is to be understood that wireless coverage areas a-i and P-Z are illustrated only schematically in FIG. 1. Different wireless coverage areas may cover wireless geographic areas of different shapes and/or sizes. Moreover, the wireless coverage areas could be either non-overlapping or partially overlapping. In some cases, one wireless coverage area may be completely encompassed within another wireless coverage area.

In an exemplary embodiment, service area 14 encompasses one generally-contiguous geographic area, and service area 18 encompasses an adjacent generally-contiguous geographic area. Thus, wireless coverage areas a-c may correspond to areas in service area 14 that border service area 18, and wireless coverage areas P-S may correspond to areas in service area 18 that border service area 14.

Although FIG. 1 shows service area 14 with wireless coverage areas a-i and shows service area 18 with wireless coverage areas P-Z, it is to be understood that service area 14 and/or service area 18 could include a greater or fewer number of wireless coverage areas.

Serving system 12 may be communicatively coupled to the base stations (such as base station 20) in service area 14, and serving system 16 may be communicatively coupled to the base stations (such as base station 22) in service area 18. In addition, serving systems 12 and 16 may be communicatively coupled to telecommunications networks, such as the public switched telephone network (PSTN) and/or packet-switched networks (such as the Internet). Serving systems 12 and 16 may also be communicatively coupled to one other, as exemplified in FIG. 1 by signaling link 26.

Serving systems 12 and 16 may function to connect voice or data calls (which may originate from the PSTN, packet-switched networks, or other networks) to mobile stations operating in service areas 14 and 18, respectively. Serving systems 12 and 16 may also enable mobile stations operating in their respective service areas to originate voice or data calls to various destinations via the PSTN or packet-switched networks. In an exemplary embodiment, serving systems 12 and 16 are mobile switching centers (MSCs). Alternatively, serving systems 12 and 16 could be softswitches or other types of network elements, or their functions could be distributed over multiple network elements.

When a serving system, such as serving system 12 or 16, receives a request to connect an incoming voice or data call to a mobile station operating in its service area, the serving system may performing a paging operation to page the mobile station being called. This paging operation may be controlled be a paging controller function in the serving system. Thus, FIG. 1 shows a paging controller 28 in serving system 12 and a paging controller 30 in serving system 16.

To page a mobile station, the paging controller may cause one or more base stations in the serving system's service area to wirelessly transmit a page message in a paging channel. The paging operation is successful when the paged mobile station answers the page message, for example, by wirelessly transmitting a page response in an access channel. In order to determine where to page a mobile station, the paging controller may determine the mobile station's last reported location. To do this, a paging controller may refer to the serving system's visitor location register (VLR), which may identify the wireless coverage area where the mobile station last registered.

For example, paging controller 26 may access a VLR 32 to determine the last reported locations of mobile stations being served by serving system 12, and paging controller 28 may access a VLR 34 to determine the last reported locations of mobile stations being served by serving system 16. Although FIG. 1 shows VLRs 32 and 34 as being part of serving systems 12 and 16, respectively, it is to be understood that the VLRs could be separate network elements. In addition, instead of referring to a VLR, a paging controller might refer to a home location register (HLR) or other type of network element to determine a mobile station's last reported location.

In some cases, a mobile station might have moved to another wireless coverage area since last reporting its location. In order to account for the inherent mobility of mobile stations, a paging controller may page a mobile station in multiple wireless coverage areas that make up a paging zone. The paging zone may include the wireless coverage area corresponding to the mobile station's last reported location and may also include one or more neighboring coverage areas. In some cases, a paging zone may include a serving system's entire service area.

The paging controller of one serving system may also request the paging controller of a serving system for an adjacent service area to page a mobile station, such as when the mobile station's last reported location corresponds to a border area. For example, paging controller 28 in serving system 12 may transmit an inter-system page request to paging controller 30 in serving system 16, via signaling link 26, to have a mobile station paged in a specified paging zone in service area 18.

The paging controller may maintain statistics regarding when attempts to page mobile stations are successful or unsuccessful. Such statistics may include historical success rates that indicate how often mobile stations have been successfully paged in different paging zones based on, for example, last reported location, time of day, network loading, etc. As described in more detail below, such success rates may include inter-system paging success rates that may be used to determine when to make inter-system page requests.

A paging controller may refer to various types of paging tables to determine how to page a mobile station. For example, a paging controller may refer to a paging zone table that specifies which wireless coverage areas make up each paging zone. To determine when a mobile station may be located in a border area where an inter-system page request may be beneficial, the paging controller may refer to an adjacent system table. Thus, serving system 12 may include an adjacent system table 38 and a paging zone table 40, which may be stored in data storage 40, and serving system 16 may include an adjacent system table 42 and a paging zone table 44, which may be stored in data storage 46.

In an exemplary embodiment, adjacent system table 38 identifies the border areas in service area 14 and, for each given border area, identifies: (i) a paging zone as being proximal to the given border area; (ii) the serving system that serves the proximal paging zone; and (iii) a historical success rate for successfully paging mobile stations in the proximal paging area when the mobile stations last reported their locations in the given border area. Table 1 below shows an example of such an adjacent service table:

TABLE 1

| Border Area | Paging Zone | Serving System | Success Rate |
|---|---|---|---|
| a | Zone 1 | System 16 | 65% |
| b | Zone 2 | System 16 | 35% |
| c | Zone 3 | System 16 | 5% |

Thus, in the exemplary adjacent system table of Table 1, wireless coverage areas a, b, and c are identified as being border areas of service area 14, and Zones 1, 2, and 3 served by serving system 16 are identified as being proximal to areas a, b, and c, respectively. In this example, the border areas are associated with different success rates for successfully paging mobile stations in the proximal paging zone, ranging from a 65% success rate for paging in Zone 1 mobile stations that last reported locations in area a, down to a 5% success rate for successfully paging mobile stations in Zone 3 that last reported locations in area c.

It is to be understood that the adjacent system table shown in Table 1 is exemplary only. For example, in addition to areas a-c, areas d-f might also be identified as border areas of serving area 14. Further, although Table 1 shows a different paging zone for each border area, the same paging zone could be identified as being proximal to all of areas a-c. In addition, a border area could be identified as being proximal to more than one paging zone, with each paging zone being associated with a respective success rate. The success rates given in an adjacent system table might also change over time, for example, as a result of paging controller 28 building up additional statistics or when changes are made to configuration of service area 14 or 16. Moreover, different success rates may be further defined for different conditions. Thus, a border area might be associated with a plurality of success rates, with different success rates being applicable for different times of the day or for different types of mobile station. Other variations are also possible.

When one serving system makes an inter-system page request to another serving system after referring to an adjacent system table, the request may specify the paging zone set forth in the table. Thus, to have a mobile station with a last reported location corresponding to wireless coverage area a paged in accordance with the adjacent system table of Table 1, serving system 12 may transmit an inter-system page request to serving system 16, and the request may specify that the mobile station is to be paged in Zone 1. The inter-system page request may identify the mobile station by its mobile directory number (MDN), international mobile subscriber identity (IMSI), or in some other manner.

When serving system 16 receives the inter-system page request specifying Zone 1, paging controller 30 may refer to paging zone table 44 to determine which coverage areas correspond to Zone 1. Given the paging zones identified in the adjacent system table of Table 1, paging zone table 44 may include entries as shown below in Table 2:

TABLE 2

| Paging Zone | Coverage Areas |
|---|---|
| Zone 1 | P, Q |
| Zone 2 | Q, R |
| Zone 3 | R, S |

Thus, when serving system 16 receives an inter-system page specifying Zone 1, paging controller 30 may look up Zone 1 in paging zone table 44 and responsively page the mobile station in coverage areas P and Q. If the mobile station does not answer the page message, then paging controller 30 may allow one or more re-transmissions of the page message in coverage area P and/or Q. As described in more detail below, paging controller 30 may determine whether to re-transmit a page message in a coverage area based on the paging channel occupancy in that coverage area. After paging the mobile station in the paging zone specified in inter-system page request (including re-transmissions), paging controller 30 may transmit a response to the inter-system page request that indicates whether the page attempt was successful.

It is to be understood that the adjacent system tables and paging zone tables as described above and as shown in Tables 1 and 2 are exemplary only. The paging controller of a serving system may refer to other types of paging table and/or other information to determine where and when to page a mobile station, including whether or when to request another serving system to page the mobile station.

3. Exemplary Paging Procedures

Figure 2:
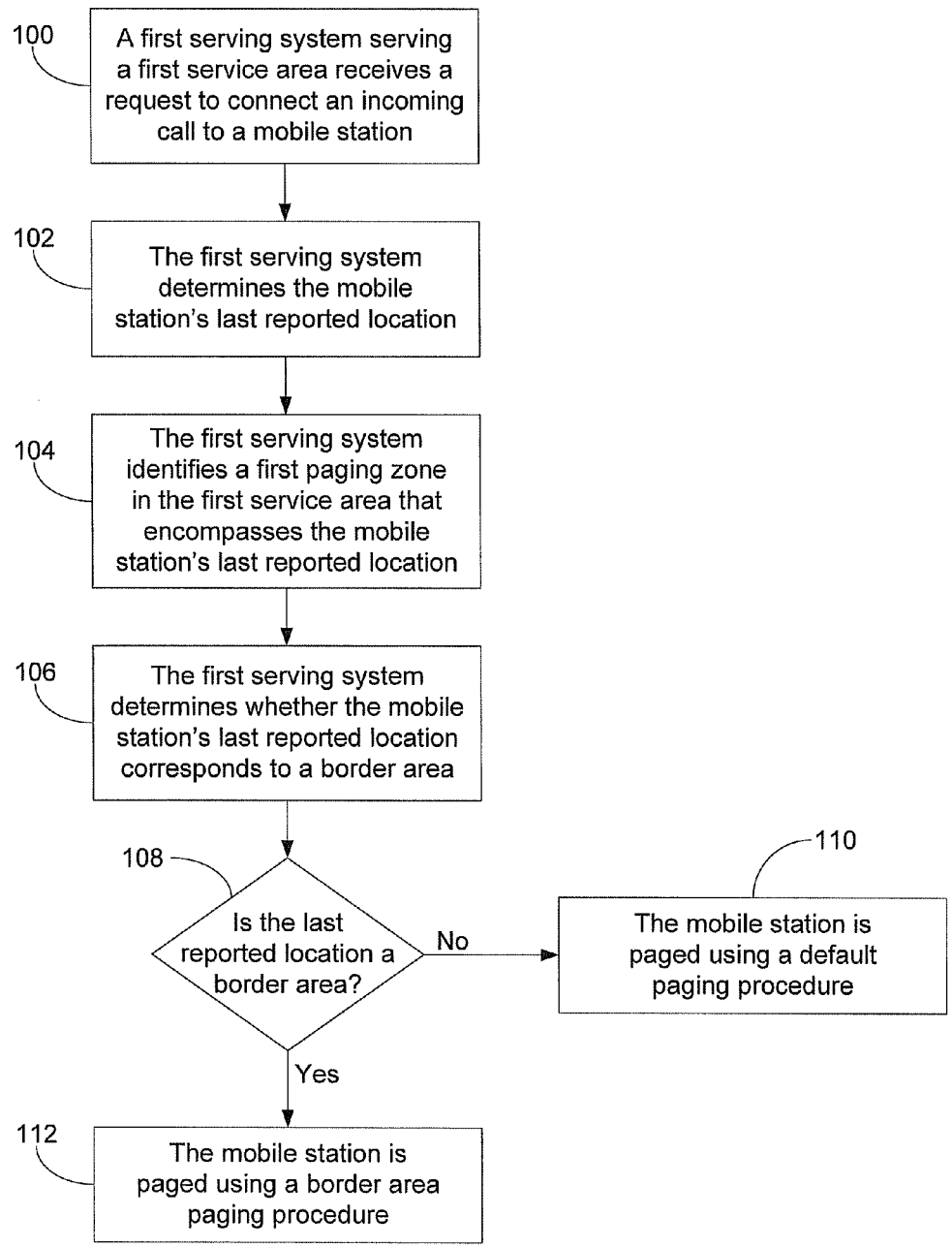
FIG. 2 is a flow chart illustrating a method of selecting a paging procedure, in accordance with an exemplary embodiment.
Figure 3:
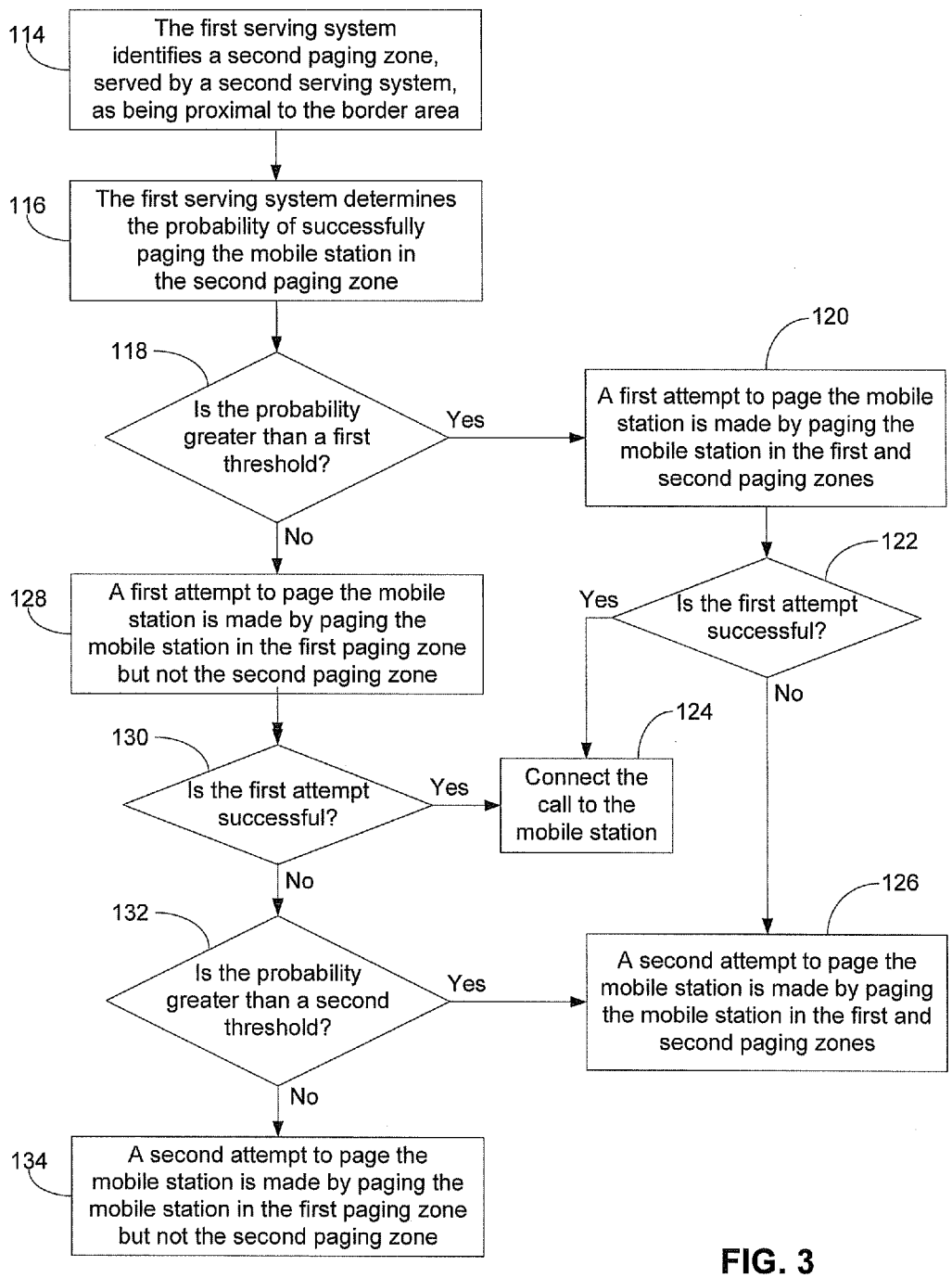
FIG. 3 is a flow chart illustrating a border area paging procedure, in accordance with an exemplary embodiment.
Figure 4:
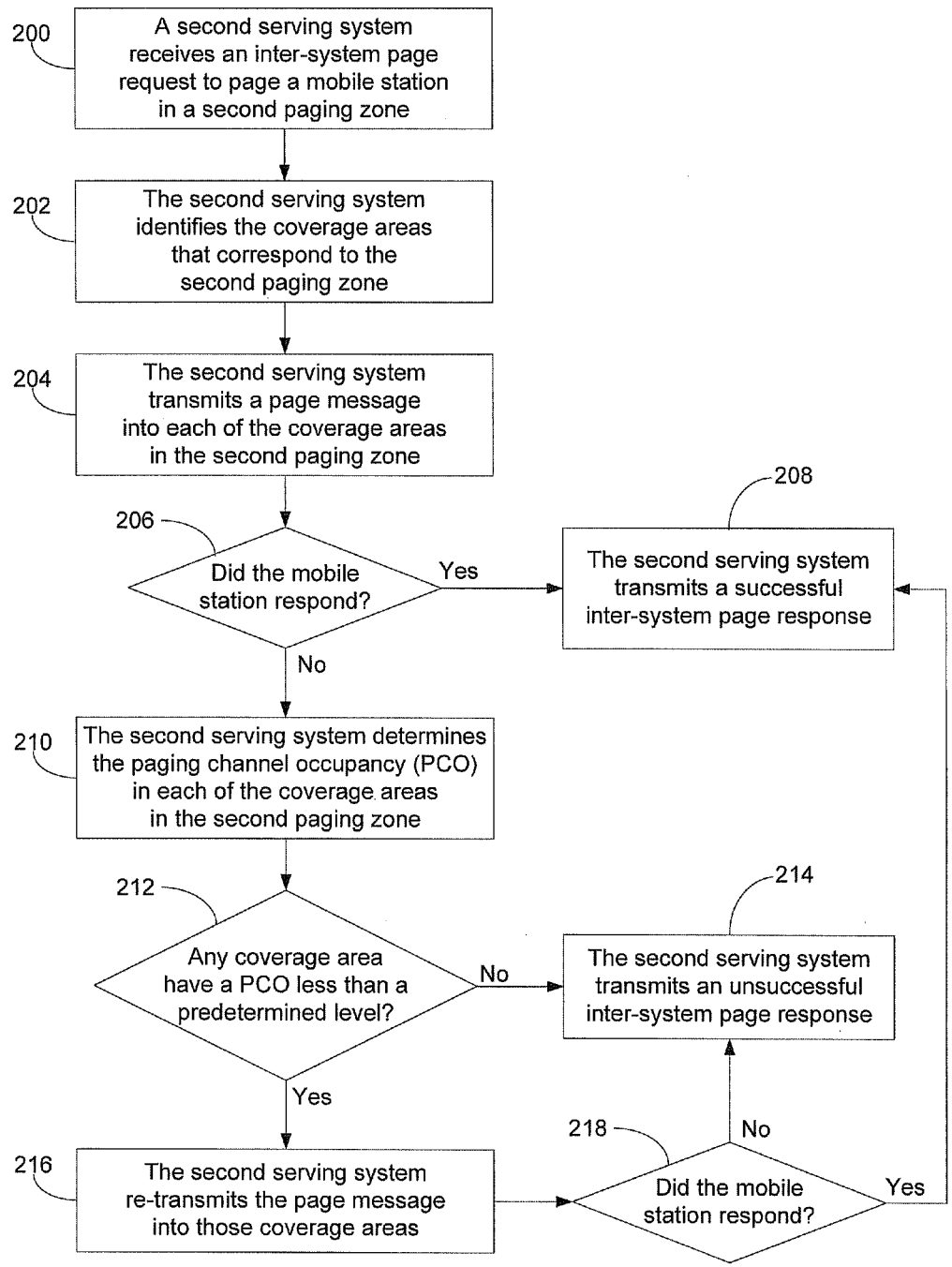
FIG. 4 is a flow chart illustrating a method of transmitting page messages in response to an inter-system page request, in accordance with an exemplary embodiment.

FIGS. 2 through 4 are flow charts illustrating exemplary procedures for paging a mobile station. FIG. 2 illustrates a method of selecting a paging procedure, FIG. 3 illustrates a border area paging procedure, and FIG. 4 illustrates a method of transmitting page messages in response to an inter-system page request. For purposes of illustration, FIGS. 2 through 4 are described with reference to wireless network 10 shown in FIG. 1. It is to be understood, however, that other network configurations could be used.

With reference to FIG. 2, the process may begin when a first serving system (e.g., serving system 12) serving a first service area (e.g., service area 14) receives a request to connect an incoming call to a mobile station (e.g., mobile station 24), as indicated by block 100. In response, the first serving system determines the mobile station's last reported location, as indicated by block 102. To determine the mobile station's last reported location, the first serving system may refer to a VLR (such as VLR 32) to determine the wireless coverage area where the mobile station was located when the mobile station last registered with wireless network 10. For example, the mobile station's last reported location may correspond to coverage area a in service area 14. The mobile station may, however, have moved into another coverage area, such as area b or c in service area 14 or area P or Q in service area 18, since its last registration.

The first serving system may then identify a first paging zone in the first service area that encompasses the mobile station's last reported location, as indicated by block 104. To identify the first paging zone, the first serving system may refer to a paging zone table (such as paging zone table 38). For example, if the mobile station's last reported location corresponds to coverage area a, the first paging zone may correspond to coverage areas a-f.

The first serving system also determines whether the mobile station's last reported location corresponds to a border area, as indicated by block 106. In some cases, the border areas may be defined as the coverage areas that are on the border of the first paging zone, so as to include coverage areas that border other paging zones within the first service area. In this example, however, the border areas are defined as the coverage areas that are on the border of the first service area. Thus, the first serving system may determine whether the coverage area corresponding to the mobile station's last reported location is a border area by determining whether the coverage area is identified in an adjacent system table (such as adjacent system table 36).

The first serving system may then select a paging procedure based on whether the mobile station's last reported location corresponds to a border area, as indicated by block 108. If the last reported location does not correspond to a border area, then the mobile station is paged using a default paging procedure, as indicated by block 110. In the default paging procedure, the mobile station might be paged initially in only the first paging zone. If that is unsuccessful, then the mobile station might be paged in a wider area, such as in all of the first service area.

On the other hand, if the mobile station's last reported location corresponds to a border area, then the mobile station might be paged using a border area paging procedure, as indicated by block 112. In the border area paging procedure, the mobile station might be paged in the first paging zone and might also be paged in one or more paging zones that are proximal to the first paging zone using an inter-system page request, as described in more detail below.

It is to be understood, however, that the method illustrated in FIG. 2 is exemplary only. For example, in the method described above for FIG. 2, the paging procedure is selected in order to page a mobile station regarding a request to connect an incoming call to a mobile station. Alternatively, a mobile station could also be paged in response to other types of communication requests.

It is also to be noted that in the method described above for FIG. 2, the border area paging procedure is selected only when the mobile station's last reported location corresponds to an area on the border of the first service area. Alternatively, the first serving system might select a border area paging procedure when the mobile station's last reported location corresponds to any border area of the first paging zone, i.e., regardless of whether the border area is on the border of or in the interior of the first service area. In that case, the border area paging procedure may not involve an inter-system page request, e.g., if the border area of the first paging zone is proximal to another paging zone in the first service area.

FIG. 3 illustrates a border area paging procedure for the case that the mobile station's last reported location corresponds to a coverage area that is on the border of the first service area (such as coverage area a in service area 14). The first serving system identifies a second paging zone, served by a second serving system (e.g., serving system 16), as being proximal to the border area, as indicated by block 114. To identify the second, proximal paging zone, the first serving system may refer to an adjacent system table, such as shown above in Table 1. Thus, if the mobile station's last reported location corresponds to area a in service area 14, the first serving system might identify Zone 1 in service area 18 (served by serving system 16) as being the second, proximal paging zone.

The first serving system may also determine the probability of successfully paging the mobile station in the second paging zone, as indicated by block 116. The first serving system may make this determination, at least in part, on the historical success rate for paging in the second paging zone mobile stations that last reported locations corresponding to that border area. The first serving system may, for example look up the historical success rate in the adjacent system table. Thus, given the adjacent system table shown in Table 1, if the mobile station's last reported location corresponds to area a, then the first serving system may determine the probability of successfully paging the mobile station in Zone 1 as being 65%. In addition to historical success rate, the first serving system may take other factors in to account, such as time of day and/or network load conditions, when determining the probability.

Whether the first serving system has the mobile station paged in the second paging zone in the first page attempt may depend on whether the probability of successfully paging the mobile station in the second paging zone exceeds a first threshold, as indicated by block 118. If the probability is greater than the first threshold, then, in the first page attempt, the mobile station is paged in both the first paging zone in the first service area and the second paging zone in the second service area, as indicated by block 120. To have the mobile station paged in the second paging zone, the first serving system may transmit to the second serving system an inter-system page request (e.g., an IS-41 ISPAGE2 request) that identifies the mobile station and the second paging zone.

The first serving system then determines whether the first page attempt is successful, as indicated by block 122. To make this determination, the first serving system may determine whether the mobile station answered the page in the first paging zone (based on responses that the first serving system receives from the base stations in the first paging zone) or whether the mobile station answered the page in the second paging zone (based on the inter-system page response that the second serving system sends the first serving system in response to the inter-system page request). The first serving system may use this information to update the paging statistics from which the historical success rates may be calculated.

If the first page attempt is successful, the call may be connected to the mobile station, as indicated by block 124. If the first page attempt is unsuccessful, then a second page attempt is made by again paging the mobile station in both the first and second paging zones, as indicated by block 126. If the second page attempt is still unsuccessful, then the mobile station may be paged in a wider area, such as all of service areas 14 and 18.

If, in block 118, it is determined that the probability is less than the first threshold, then the first page attempt is made by paging the mobile station in the first paging zone but not the second paging zone, as indicated by block 128. The first serving system then determines whether the first page attempt is successful, as indicated by block 130. If the first page attempt is successful, the call is connected to the mobile station, as indicated by block 124.

If the first page attempt is unsuccessful, the probability of successfully paging the mobile station in the second paging zone may be compared to a second threshold, as indicated by block 132. If the probability is greater than the second threshold, then a second page attempt may be made by paging the mobile station in both the first and second paging zones, as indicated by block 126. If the probability is less than the second threshold, then the second page attempt is made by again paging the mobile station in the first paging zone but not the second paging zone, as indicated by block 134. If the second page attempt is still unsuccessful, then the mobile station may be paged in a wider area, such as all of service areas 14 and 18.

The second threshold may be lower than the first threshold. In this way, the first and second thresholds may be chosen so as to use paging channel resources efficiently. For example, the first threshold may be selected so that the mobile station is paged in the second, proximal paging zone during the first page attempt in those instances when the probability of success is sufficiently high to justify the use of paging channel resources in the second paging zone. The second threshold may be selected so that the mobile station is paged in the second, proximal paging zone during the second page attempt in those instances when the probability of success is sufficiently high so that paging the mobile station in the second paging zone is more efficient than the alternative approach of paging the mobile station in a wider area.

For example, the first threshold could be 60% and the second threshold could be 10%. Given those thresholds, and the adjacent system table shown in Table 1, the proximal paging zone (Zone 1) would be included in the first attempt to page a mobile station that last registered from area a, the proximal paging zone (Zone 2) would be included in the second attempt but not the first attempt to page a mobile station that last registered from area b, and the proximal paging zone would not be included in either the first or second attempts to page a mobile station that last registered from area c. It is to be understood that these values for the first and thresholds are exemplary only, as other values could be used.

To facilitate additional efficiency in the use of paging channel resources, the second serving system may determine whether to re-transmit a page message requested by an inter-system page request based on paging channel occupancy. An example of this approach is illustrated in FIG. 4.

With reference to FIG. 4, a second serving system (e.g., serving system 16) receives an inter-system page request to page a mobile station (e.g., mobile station 24) in a second paging zone, as indicated by block 200. The inter-system page request may be transmitted by a first serving system (e.g., serving system 12) as part of either a first attempt or a second attempt to page the mobile station.

In response to the inter-system page request, the second serving system identifies the wireless coverage areas that correspond to the second paging zone, as illustrated by block 202. To identify the wireless coverage areas, the second serving system may refer to a paging zone table (such as paging zone table 44). For example, if the inter-system page request specifies that the mobile station is to be pages in Zone 1, the second serving system may refer to a paging zone table as shown in Table 2 to determine that the specified paging zone is made up of coverage areas P and Q.

The second serving system transmits a page message into each of the coverage areas in the second paging zone, as illustrated by block 204. The second serving system then determines whether the mobile station responded to the page, as indicated by block 206. If the mobile station responded to the page, the second serving system transmits a successful inter-system page response, as indicated by block 208.

If the mobile station did not respond to the page, the second serving system determines the paging channel occupancy (PCO) in each of the coverage areas in the second paging zone. The second serving system then compares the PCO in each of these coverage areas with a predetermined occupancy level (L) to determine whether PCO<L in any of the coverage areas in the second paging zone, as indicated by block 212. The value of L could correspond to an occupancy level of about 50%, however different values of L could be defined for different coverage areas. If none of the coverage areas in the second paging zone has a PCO<L, then the paging channels are too congested to justify re-transmission of the page message. In that case, the second serving system would transmit an unsuccessful inter-system page response, as indicated by block 214.

However, if any coverage area in the second paging zone has a PCO<L, then the second serving system may re-transmit the page message into that coverage area, as indicated by block 216. The second serving system then determines whether the mobile station responded to the re-transmitted page message, as indicated by block 218. If the mobile station responded, then the second serving system transmits a successful inter-system page response, as indicated by block 208. Otherwise, the second serving system transmits an unsuccessful inter-system page response, as indicated by block 214.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for paging a mobile station, said method comprising:
   determining that a last reported location of said mobile station corresponds to a first area in a first paging zone, wherein said first paging zone is served by a first serving system;
   determining that said first area is proximal to a second paging zone, wherein said second paging zone is served by a second serving system;
   determining a probability of successfully paging said mobile station in said second paging zone;
   determining that said probability is less than a first threshold;
   in response to determining that said probability is less than said first threshold, making a first attempt to page said mobile station, wherein said first attempt comprises paging said mobile station in said first paging zone but not in said second paging zone;
   determining that said first attempt to page said mobile station was unsuccessful;
   in response to determining that said first attempt to page said mobile station was unsuccessful, comparing said probability to a second threshold, wherein said second threshold is lower than said first threshold;
   if said probability is greater than said second threshold, making a second attempt to page said mobile station, wherein said second attempt comprises paging said mobile station in said first paging zone and transmitting an inter-system page request to said second serving system to page said mobile station in said second paging zone; and
   if said probability is less than said second threshold, making a second attempt to page said mobile station, wherein said second attempt comprises paging said mobile station in said first paging zone but not in said second paging zone.

2. The method of claim 1, wherein said first serving system comprises a first mobile switching center (MSC) and said second serving system comprises a second MSC.

3. The method of claim 1, further comprising:
   second serving system receiving said inter-system page request from said first serving system; and in response to said inter-system page request, said second serving system transmitting at least one page message into a second area in said second paging zone.

4. The method of claim 3, wherein said second serving system transmitting at least one page message into a second area in said second paging zone comprises:
   transmitting a first page message into said second area;
   determining that said mobile station has not responded to said first page message;
   determining a paging channel occupancy in said second area; and
   if said paging channel occupancy is less than a predetermined level, transmitting a second page message into said second area.

5. The method of claim 1, wherein determining that a last reported location of said mobile station corresponds to a first area in a first paging zone comprises:
   determining that said mobile station last registered from said first area.

6. The method of claim 1, wherein said first area corresponds to a wireless coverage area provided by a base station.

7. The method of claim 6, wherein said wireless coverage area is a cell.

8. The method of claim 7, wherein said first paging zone corresponds to a first plurality of cells and said second paging zone corresponds to a second plurality of cells.

9. The method of claim 1, wherein determining that said first area is proximal to a second paging zone comprises:
   looking up said first area in a table that identifies proximal paging zones for border areas of said first paging zone.

10. The method of claim 1, wherein determining a probability of successfully paging said mobile station in said second paging zone comprises:
    looking up a historical success rate for successfully paging in said second paging zone mobile stations having last reported locations corresponding to said first area in said first paging zone.

11. A method for a wireless network, said wireless network comprising a first serving system serving a first service area and a second serving system serving a second service area, said first service area including a border area that is proximal to said second service area, said method comprising:
    said first serving system receiving a request to connect an incoming call to a mobile station having a last reported location corresponding to said border area;
    said first serving system looking up an inter-system paging success rate for said border area;
    said first serving system comparing said inter-system paging success rate to at least one of a first threshold or a second threshold;
    in response to said inter-system paging success rate being above said first threshold, said first serving system making a first attempt to page said mobile station by transmitting an inter-system page request to said second serving system;
    in response to said inter-system paging success rate being below said first threshold but above said second threshold, said first serving system making a first attempt to page said mobile station without transmitting an inter-system page request to said second serving system and, if unsuccessful, making a second attempt to page said mobile station by transmitting an inter-system page request to said second serving system; and
    in response to said inter-system paging success rate being below said second threshold, said first serving system making a first attempt to page said mobile station without transmitting an inter-system page request to said second serving system and, if unsuccessful, making a second attempt to page said mobile station without transmitting an inter-system page request to said second serving system.

12. The method of claim 11, wherein said inter-system paging success rate is associated with said border area and a paging zone in said second service area.

13. The method of claim 12, wherein said inter-system page request specifies said paging zone.

14. The method of claim 13, further comprising:
    said second serving system receiving said inter-system page request; and
    in response to said inter-system page request, said second serving system transmitting at least one page message into said paging zone.

15. The method of claim 12, wherein said first serving system looking up an inter-system paging success rate comprises said first serving system referring to a table that identifies a plurality of border areas in said first service area and, for each given border area, identifies a respective paging zone in said second service area as being proximal to said given border area and a respective inter-system paging success rate for successfully paging in said respective paging zone mobile stations having last reported locations corresponding to said given border area.

* * * * *